United States Patent
King

(10) Patent No.: US 6,251,163 B1
(45) Date of Patent: Jun. 26, 2001

(54) METHOD FOR RECOVERING GOLD FROM REFRACTORY CARBONACEOUS ORES

(75) Inventor: James A. King, West Vancouver (CA)

(73) Assignee: Placer Dome, Inc. (CA)

( * ) Notice: Subject to any disclaimer, the term of this patent is extended or adjusted under 35 U.S.C. 154(b) by 0 days.

(21) Appl. No.: 09/034,846

(22) Filed: Mar. 4, 1998

(51) Int. Cl.⁷ .................................................. C22B 3/06
(52) U.S. Cl. ......................... 75/744; 423/26; 423/27; 209/164
(58) Field of Search .................. 75/744; 423/27, 423/26; 209/164

(56) References Cited

U.S. PATENT DOCUMENTS

| | | |
|---|---|---|
| 4,070,182 | 1/1978 | Genik-Sas-Berezowsky et al. .......................................................................... 75/103 |
| 4,269,622 | 5/1981 | Kerley, Jr. ............................... 75/103 |
| 4,369,061 | 1/1983 | Kerley, Jr. ............................... 75/103 |
| 4,384,889 | 5/1983 | Wiewiorowski et al. .............. 75/101 |
| 4,552,589 | 11/1985 | Mason et al. ........................... 75/105 |
| 4,571,264 * | 2/1986 | Weir et al. ............................... 75/744 |
| 4,585,561 * | 4/1986 | Zlokarnik et al. ...................... 75/713 |
| 4,605,439 * | 8/1986 | Weir ........................................ 75/744 |
| 4,654,078 | 3/1987 | Perez et al. ............................. 75/118 |
| 4,654,079 * | 3/1987 | Nunez et al. ........................... 423/29 |
| 4,723,998 | 2/1988 | O'Neil .................................... 75/101 |
| 4,738,718 | 4/1988 | Bakshani et al. ...................... 75/105 |
| 4,765,827 | 8/1988 | Clough et al. ............................. 75/2 |
| 4,801,329 | 1/1989 | Clough et al. ........................... 75/97 |
| 4,816,235 | 3/1989 | Pesic ...................................... 423/32 |
| 4,902,345 | 2/1990 | Ball et al. ............................... 75/118 |
| 4,923,510 | 5/1990 | Ramadorai et al. ................... 423/29 |
| 4,925,485 | 5/1990 | Schulze .................................. 423/22 |
| 5,071,477 | 12/1991 | Thomas et al. ........................ 75/744 |
| 5,127,942 | 7/1992 | Brierley et al. ........................ 75/744 |
| 5,215,575 | 6/1993 | Butler .................................... 75/744 |
| 5,236,492 | 8/1993 | Shaw et al. ............................. 75/744 |
| 5,354,359 | 10/1994 | Wan et al. .............................. 75/744 |
| 5,536,297 | 7/1996 | Marchbank et al. .................. 75/736 |
| 5,536,480 * | 7/1996 | Simmons ............................... 423/28 |
| 5,626,647 * | 5/1997 | Kohr ...................................... 75/744 |
| 5,653,945 * | 8/1997 | Gathje et al. .......................... 423/26 |
| 5,785,736 | 7/1998 | Thomas et al. ........................ 75/736 |

FOREIGN PATENT DOCUMENTS

WO 91/11539   8/1991   (WO).

OTHER PUBLICATIONS

Hydrometallurgy; Affinity of activated carbon towards some gold (I) complexes; 1990 No month.

Hydrometallurgy; Copper–catalyzed thiosulfae leaching of lowgrade gold ores; 1992 No month.

Atluri; "Recovery of Gold and Silver From Ammoniacal Thiosulfate Solutions Containing Copper by Resin Ion Exchange Method"; Thesis Submitted to the Faculty of the Department of Materials Science and Engineering (University of Arizona); 1987. No month.

Agadzhanyan et al.; "Kinetics of Ion Exchange in Selective Systems, II. Kinetics of the Exchange of Differently Charged Ions in a Macroporous Ion Exchanger", *Russian Journal of Physical Chemistry*; vol. 61: 1987; pp. 994–997. No month.

Marcus; "The Anion Exchange of Metal Complexes —The Silver—Thiosulphate System"; ACTA Chemica Scandinavica II; 1957; pp. 619–627. No month.

\* cited by examiner

*Primary Examiner*—Roy King
*Assistant Examiner*—Tima McGuthry-Banks
(74) *Attorney, Agent, or Firm*—Sheridan Ross P.C.

(57) ABSTRACT

The process of the present invention recovers precious metals from refractory carbonaceous precious metal ores by floating a portion of the ground ore, blending the concentrate with an unfloated portion of the ore, autogenously autoclaving the blended material, cooling the oxidized slurry by dilution, leaching the oxidized slurry after dilution in the presence of a thiosulfate lixiviant, and recovering the precious metal by suitable techniques.

18 Claims, 2 Drawing Sheets

METHOD FOR RECOVERING GOLD FROM REFRACTORY CARBONACEOUS ORES

FIELD OF THE INVENTION

The process of the present invention is directed generally to the recovery of precious metals from refractory carbonaceous concentrates and specifically to the recovery of precious metals from refractory carbonaceous concentrates by pressure oxidation techniques.

BACKGROUND OF THE INVENTION

A significant quantity of gold is contained in refractory ores, which contain substantial amounts of sulfide minerals such as arsenopyrite, marcasite, and pyrite. Such sulfide minerals can encapsulate significant amounts of the gold. Pressure oxidation is a common technique to unlock the encapsulated gold. In pressure oxidation, the ore or concentrate is formed into an aqueous slurry and treated in an autoclave at elevated temperature and (oxygen) pressure to oxidize the sulfur to form sulfuric acid and render the gold soluble in a cyanide lixiviant.

During subsequent cyanide leaching of the oxidized ore, preg robbing can occur. Preg robbing occurs in carbonaceous ores when natural carbon in the ore captures the liberated gold once it has been dissolved into the aqueous phase of the slurry using cyanide. Blanking agents, such as kerosene and sodium lauryl sulfate, have been used with only limited success to prevent gold adsorption onto the fine natural carbon in the ore or concentrate.

In designing an effective process for recovering gold and other precious metals from refractory, carbonaceous ores, there are a number of considerations. First, gold and precious metal recovery should be as high as possible. As little gold and precious metals as possible should be lost through sulfide encapsulation or preg robbing. Second, pressure oxidation should be autogenous if possible. In this manner, expensive heat exchangers or heaters are not required to add external heat to the autoclave feed slurry during pressure oxidation. Third, the autoclave should have as small a size as possible for a selected autoclave feed slurry capacity to minimize capital and operating costs. Finally, the oxidized autoclave feed slurry, after pressure oxidation, should be cooled as economically as possible before leaching.

SUMMARY OF THE INVENTION

These and other design objectives are realized by the process of the present invention. The process includes the steps of:

(a) floating a first portion of a feed material including a precious metal to form a concentrate fraction and a tails fraction;

(b) combining at least a portion of the concentrate fraction with a second portion of the feed material to form a combined feed material;

(c) subjecting the combined feed material to pressure oxidation in an autoclave to produce an oxidized feed material comprising the precious metal constituents of the feed material;

(d) leaching the precious metal from the oxidized feed material to produce a pregnant leach solution containing dissolved precious metal and a waste material; and (e) recovering the precious metal from the pregnant leach solution.

The feed material can be any refractory and/or carbonaceous precious metal-containing ore. The ore can contain a variety of precious metals, including gold and silver, and mixtures thereof with gold being most preferred.

The flotation of the first portion of the feed material in step (a) permits the autoclave in the pressure oxidation step to have a smaller capacity, particularly for relatively low grade ores. The use of a smaller autoclave results in a significant savings in capital costs.

Preferably, the pressure oxidation in step (c) is autogenous (i.e., self heating) so that there is no requirement that external heat be supplied to the combined feed material. The avoidance of heat transfer to the material provides further reductions in capital and operating costs by eliminating the need for heat exchangers or heaters, such as slurry preheat towers to preheat the feed material.

The autogenous operation of the autoclave is made possible by the combining step (b) in which the concentrate fraction (which typically has a sulfide sulfur content of greater than about 6 percent by weight) is combined with the second portion of the feed material (which typically has not been floated and therefore has a lower sulfide content than the concentrate fraction, i.e., the typical sulfide sulfur content ranges from about 0.5 to about 4% by weight). Blending of the materials is performed to provide a combined feed material preferably having a total sulfide sulfur content ranging from about 4 to about 10 percent by weight. Commonly, the volumetric ratio of the concentrate fraction to the second portion in the combining step ranges from about 1:2 to about 10:1.

In some applications, the second portion is a high grade ore and the first portion is a low grade ore. The division of the feed material into the two portions can be performed by known techniques, such as selective mining. In this manner, the recovery from the high grade ore is substantially maximized, i.e., there is no loss of gold in the flotation tailings fraction.

In pressure oxidation, the temperature preferably ranges from about 180 to about 240° C. while the pH of the slurried feed material in the autoclave preferably ranges from about pH 0.5 to about pH 2.0. Under these conditions, up to about 98% of the sulfide sulfur in the feed material may be oxidized if so required to liberate the gold from the sulfides and maximize subsequent gold recovery.

In the leaching step (d), the lixiviant is preferably a thiosulfate salt that is mixed with an aqueous slurry containing the oxidized feed material. Preferably, the concentration of the thiosulfate salt in the slurry ranges from about 5 to about 100 g/l. A catalyst, such as copper, can be included in the lixiviant to promote solubilization of the precious metal as a thiosulfate complex.

To neutralize any carbonates in the feed material, the process can further include the step of contacting the feed material with an acid before pressure oxidation. The acid can wholly or in part be sulfuric acid generated during pressure oxidation.

To lower the temperature and raise the pH of the slurried oxidized feed material after pressure oxidation, the process can include the step of contacting the slurry with a diluent (e.g., water) to decrease the temperature of the slurry. The volumetric ratio of the slurry to the diluent preferably ranges from about 1:2 to about 1:15.

To recover the precious metal from the pregnant leach solution, resin-in-leach techniques are preferred. Carbon-in-leach and carbon-in-pulp techniques are not effective in adsorbing gold thiosulfate complexes from aqueous slurries. Recovery of gold as a precipitate using cementation with metals such as copper is also an alternative to using resin-in-pulp techniques for gold recovery.

DETAILED DESCRIPTION

Figure 1A:
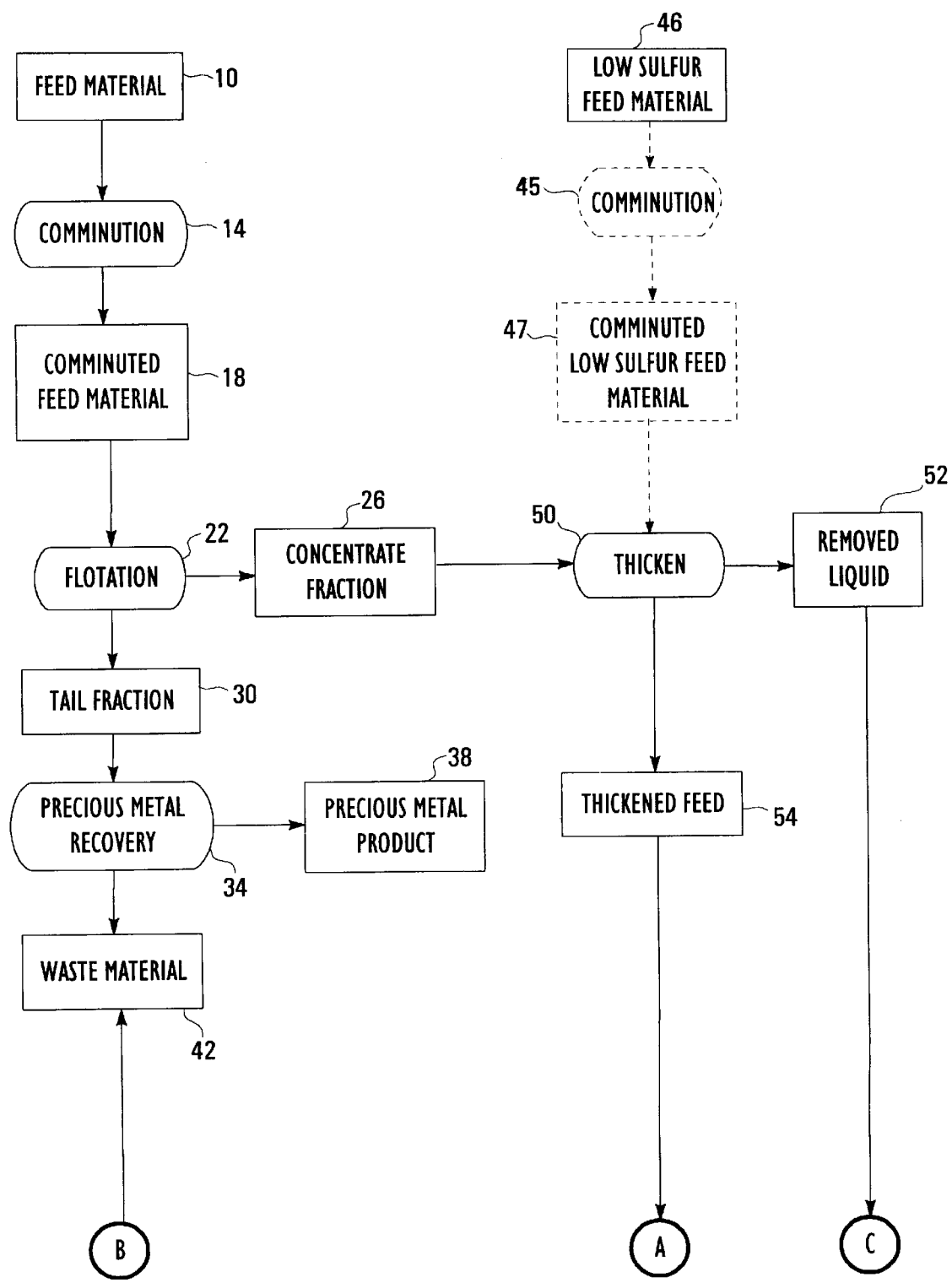
FIGS. 1A and 1B are flow schematics of a preferred embodiment of the process of the present invention.
Figure 1B:
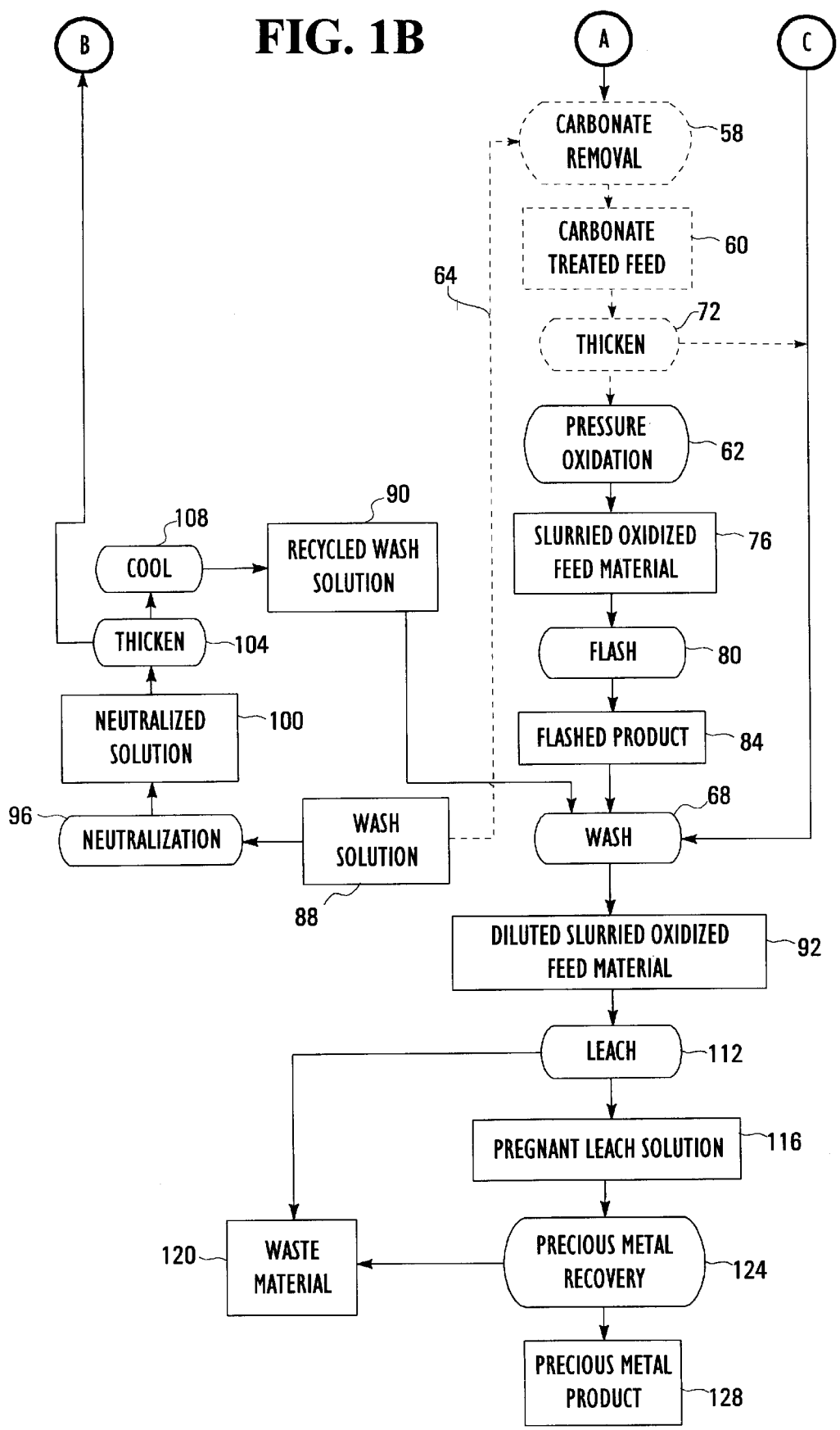

FIGS. 1A and 1B depict a preferred embodiment of the precious metal recovery process of the present invention. As will be appreciated, additional steps can be added depending upon the type of feed material 10 being treated.

The precious metal-containing feed material 10 (and low sulfur feed material), which typically contains one or more precious metals, such as gold and silver (with gold being most typical), and one or more base metals, such as copper, lead, zinc, nickel, iron, arsenic and antimony is comminuted 14 or 47 to produce a comminuted feed material 18 (or comminuted low sulfur feed material 47). Comminution 14 or 47 can be by any known technique, such as by wet or dry crushing followed by wet or dry grinding. Preferably, the $P_{80}$ size of the comminuted feed material 18 ranges from about 25 to about 250 microns and more preferably from about 75 to about 150 microns.

The comminuted feed material 14 is slurried and subjected to flotation 22 to produce a concentrate fraction 26 and a tail fraction 30. Flotation 22 is preferably performed at a pH ranging from about pH 4.5 to about pH 10, in the presence of a collector, such as xanthate, dithiophosphate, and thiocarbinamine, and a frother, such as methyl iso-butyl carbonyl, long-chained alcohol and polypropylene glycol-methyl ether. The collector preferably has a concentration in the slurried comminuted feed material ranging from about 5 to about 200 g/l while the frother has a concentration in the slurried comminuted feed material ranging from about 5 to about 100 g/l.

The tail fraction 30 may be subjected to additional precious metal recovery 34 by any suitable technique to produce a precious metal product 38 and a waste material 42. A preferred technique for precious metal recovery 34 is by carbon-in-leach and/or gravity separation techniques.

The concentrate fraction 26 constitutes a substantial fraction of the comminuted feed material 18 and has a higher sulfide content than the comminuted feed material 18. Commonly, the concentrate fraction 26 constitutes from about 3 to about 30% by weight; and more commonly from about 6 to about 20% of the comminuted feed material 18. Typically, the concentrate fraction 26 has a sulfide sulfur content of at least about 6 percent sulfur by weight, more typically at least about 8 percent sulfur by weight, and most typically from about 8 to about 20 percent sulfur by weight. Preferably, at least about 75% of the precious metal content of the comminuted feed material 18 is contained in the concentrate fraction 26.

The concentrate fraction 26 is combined with a low sulfur feed material 46 in a thickening step 50 to form a thickened feed material 54. Thickening can reduce the required autoclave volumetric capacity and therefore capital costs. Thickening can assist in making the autoclave feed autogenous and negate the requirement for expensive steam addition to the slurry to bring the slurry temperature up to the normal set point. A suitable flocculent can be added to promote separation of the solids from the liquid.

The low sulfur feed material 46 has a lower sulfide content than the concentrate fraction 26 and can have a higher precious metal content than the comminuted feed material 18. Typically, the low sulfur feed material 46 has a sulfide sulfur content of no more than about 4 percent sulfur by weight and more preferably ranging from about 1 to about 3 percent sulfur by weight. Although the low sulfur feed material 46 can be any material that dilutes the sulfur content of the concentrate fraction 26, the low sulfur feed material is preferably a high grade feed material 46 formed by selective mining of the comminuted feed material 18.

The relative amounts of concentrate fraction 26 and low sulfur feed material 46 combined in the thickening step 50 depend on the sulfide contents of each. Preferably, the thickened feed 54 has a sulfide sulfur content of at least about 4 percent sulfur by weight and more preferably ranging from about 6 to about 20 percent sulfur by weight and most preferably from about 9 to about 12 percent sulfur by weight. Typically, the weight ratio of concentrate fraction 26 to low sulfur feed material 46 in the thickened feed material 54 ranges from about 1:20 to about 1:1 and more typically from about 1:10 to about 1:2.

In the thickening step 50, excess liquid 52 is removed by solid/liquid separation techniques from the combined material. Preferably, the thickened feed slurry 54 has a solids content ranging from about 40 to about 60 percent solids by weight and more preferably from about 50 to about 60 percent solids by weight.

If the thickened feed 54 contains significant quantities of carbonates, the thickened feed 54 can be subjected to a carbonate removal step 58 to form a carbonate treated feed 60. In the carbonate removal step 58, the thickened feed 54 is contacted with an acid, such as sulfuric acid from a pressure oxidation step 62, to neutralize all or part of the carbonates. The sulfuric acid preferably is contained in a bleed stream 64 from a washing step 68.

The carbonate treated feed 60 is preferably subjected to a further thickening step 72 prior to the pressure oxidation step 62 to provide a solid content of the feed 60 ranging from to about 50 to about 60 percent solids by weight.

The thickened feed 54 (or thickened carbonate treated feed) is subjected to a pressure oxidation step 62 in an autoclave using oxygen gas at elevated pressure to oxidize sulfide sulfur to sulfuric acid and metal sulfates and form a slurried oxidized feed material 76. When the sulfide sulfur is oxidized the precious metal is released from the refractory sulfide matrix in which it was formerly embedded.

While not wishing to be bound by any theory, it is believed that oxidation of gold bearing the sulfide sulfur mineral, which is usually in the form of an iron sulfide or iron arsenic sulfide, is believed to occur in accordance with the following reactions:

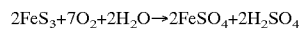
$$2FeS_3 + 7O_2 + 2H_2O \rightarrow 2FeSO_4 + 2H_2SO_4$$

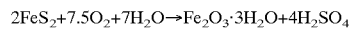
$$2FeS_2 + 7.5O_2 + 7H_2O \rightarrow Fe_2O_3 \cdot 3H_2O + 4H_2SO_4$$

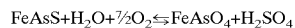
$$FeAsS + H_2O + \tfrac{7}{2}O_2 \leftrightarrows FeAsO_4 + H_2SO_4$$

$$FeAsS + H_2O + \tfrac{7}{2}O_2 + \tfrac{1}{2}H_2SO_4 \leftrightarrows \tfrac{1}{2}Fe_2(SO_4)_3 + H_3AsO_4$$

Pressure oxidation 62 is preferably conducted under conditions sufficient to realize autogenous operation of the autoclave. As will be appreciated, "autogenous" operation refers to a self-heating oxidation of sulfide sulfur in the presence of oxygen gas. The total gas pressure in the autoclave is preferably superatmospheric and more preferably ranges from about 200 to about 600 psi. The operating autoclave temperature for oxidation of the thickened feed 54 (or thickened carbonate treated feed) is preferably in the range from about 180 to about 240° C. and more preferably from about 195 to about 225° C. The sulfuric acid content of the thickened feed 54 (or thickened carbonate treated feed) is preferably maintained in the range from about 0.5 to about 20 g/l.

The pressure oxidation step 62 is conducted for a sufficient period of time to oxidize a sufficient fraction of the sulfide minerals to liberate the encapsulated gold. This could represent as little as about 20% and as much as about 100% of the sulfide sulfur minerals in the feed. Typically, the residence time of the feed in the autoclave is at least about 20 minutes and more typically ranges from about 30 minutes to about 2 hrs.

The slurried oxidized feed material 76 is passed through one or a series of flash tanks 80 to cool the material. The resulting flashed product 84 preferably has a temperature that is close to the boiling point of water at the altitude of the process plant above sea level. Thus, the flashed product commonly has a temperature ranging from about 85 to about 105° C. The steam from the flash tank(s) can be passed through suitable equipment (e.g., cyclones) to remove solids from the steam. The solids can be returned to the flashed product 84. The steam can be used to preheat the thickened feed 54 (or thickened carbonate treated feed) prior to pressure oxidation 62.

The flashed product 84 is washed 68 using an aqueous recycled wash solution 90 to produce a wash solution 88 and a diluted slurried oxidized feed material 92. During washing, the temperature and acidity of the flashed product is substantially decreased through dilution. The volumetric ratio of the recycled wash solution 90 to the flashed product 84 is preferably at least about 3:1 and more preferably ranges from about 3:1 to about 15:1 and most preferably from about 7:1 to about 12:1. The temperature of the diluted slurried oxidized feed material 92 is preferably no more than about 40° C. and most preferably ranges from about 25 to about 35° C. The acid content of the diluted slurried oxidized feed material 92 is preferably no more than about 2 g/l and more preferably ranges from about 0.5 to about 1 g/l while the acid content of the wash solution 88 preferably ranges from about 0.1 to about 10.0 g/l and more preferably from about 0.2 to about 4.0 g/l.

A bleedstream 64 of the wash solution 88 can be used in the carbonate removal step 58 as noted above.

The wash solution 88 is subjected to neutralization 96 to produce a neutralized solution 100. Neutralization 96 can be accomplished by contacting the wash solution 88 with a base material such as lime, limestone, carbonate containing flotation tailing, a low grade ore, or barren rock (such as the waste material 42). Preferably, after neutralization 96 the neutralized solution 100 has an acid content of no more than about 0.5 g/l and more preferably no more than about 0.1 g/l to yield a pH of preferably no less than about pH 3 and more preferably no less than about pH 4.5.

The neutralized solution 100 is thickened with the solids being discarded as waste material 42 and the removed liquid being cooled 108 to remove heat transferred to the wash solution 88 from the flashed product 84. The cooled liquid or recycled wash solution 90 is returned to the washing step 68 for reuse.

The diluted slurried oxidized feed material 92 is leached 112 with a lixiviant to form a pregnant leach solution 116 and a leach residue or waste material 120. The leaching agent in the lixiviant can be any suitable compound for solubilizing the precious metal with thiosulfate such as ammonium thiosulfates, calcium thiosulfates, and sodium thiosulfates being most preferred. Using thiosulfate as the leaching agent, the solubilization of gold is according to the following equation:

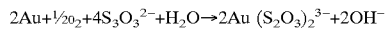
$2Au + \frac{1}{2}O_2 + 4S_3O_3^{2-} + H_2O \rightarrow 2Au(S_2O_3)_2^{3-} + 2OH^-$ Preferably, the feed material 92 during the leaching step has a temperature ranging from about 25 to about 60° C. and more preferably from about 30 to about 45° C., a solids content ranging from about 10 to about 60 percent by weight, and a pH ranging from about pH 7 to about pH 11.

A catalyst can be included in the lixiviant to promote solubilization of the gold as a thiosulfate complex. Preferred catalysts include copper, and ammonia and mixtures thereof. The concentration of the copper in the feed material 92 preferably ranges from about 20 to about 1000 ppm and most preferably from about 20 to about 50 ppm. In the case of copper as the catalyst, ammonia can be added to the feed material 92 in an amount sufficient to yield a ratio of at least about 2 moles $NH_3$:1 mole Cu and more preferably of at least about 4 moles $NH_3$:1 mole Cu.

The pregnant leach solution 116 is subjected to precious metal recovery 124 to produce a precious metal product 128. Although precious metal recovery can be performed by any of a number of known techniques, resin-in-pulp ("RIP") techniques are most preferred for gold recovery. It has been discovered that other techniques such as carbon-in-leach ("CIL") techniques are not effective in gold recovery. In RIP techniques, the gold is absorbed onto a resin, such as weak, strong, or moderate base, and mixtures thereof, to form a pregnant resin containing the gold and a stripped leach solution. Gold is then desorbed from the pregnant resin to form a gold enriched eluant and a stripped resin, using pH adjustment, anion displacement, and/or gold complex decomposition to remove the gold from the resin. A high purity gold product is preferably recovered from the gold enriched eluant by cementation techniques using zinc dust or other suitable metal powders to precipitate the contained gold values.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A process for recovering a precious metal from a feed material comprising a precious metal sulfide, comprising:

(a) floating a first portion of the feed material to form a concentrate fraction having a first sulfide sulfur content and a tails fraction;

(b) combining at least a portion of the concentrate fraction with a second portion of the feed material that is not floated and having a second sulfide sulfur content to form a combined feed material wherein the second sulfide sulfur content is less than the first sulfide sulfur content and wherein the sulfide sulfur content of the combined feed material ranges from about 6 to about 20% by weight;

(c) subjecting the combined feed material to pressure oxidation in an autoclave at a slurry temperature ranging from about 195 to about 225° C. and at a pressure ranging from about 200 to about 600 psi to produce an oxidized feed material comnprising at least most of the precious metal;

(d) leaching the precious metal from the oxidized feed material to produce a pregnant leach solution containing at least most of the precious metal in the oxidized feed material and a waste material; and (e) recovering the precious metal from the pregnant leach solution, wherein the concentrate fraction has a sulfide sulfur content ranging from about 5 to about 30 percent sulfur by weight and the second portion has a sulfide sulfur content ranging from about 1 to about 3 percent sulfur by weight and wherein the amount of the second portion in the combined feed material ranges from about 40 to about 95% by weight.

2. The process of claim 1, wherein the pressure oxidation in step (c) is autogenous.

3. The process of claim 1, further comprising:
recovering metal sulfides contained in the tails fraction.

4. The process or claim 1, further comprising after the subjecting step (c):
contacting the oxidized feed material with a wash solution to form an acidic wash solution containing at least a portion of an acid in the oxidized feed material;
contacting the acidic wash solution with a base material to form a recycle wash solution; and
contacting the recycle wash solution with the oxidized feed material.

5. The process of claim 1, wherein the pH of the combined feed material during pressure oxidation ranges from about pH 0.5 to about pH 2.

6. The process of claim 1, wherein the leaching step comprises:
contacting the oxidized feed material with a lixiviant comprising a thiosulfate.

7. The process of claim 6, wherein the concentration of the thiosulfate in the lixiviant ranges from about 2 to about 200 g/l.

8. The process of claim 6, wherein the leaching step comprises:
forming the oxidized feed material into a slurry having a pH ranging from about pH 7 to about pH 11.

9. The process of claim 6, wherein in the leaching step:
the oxidized feed material is contained in a slurry and the temperature of the slurry ranges from about 20 to about 45° C.

10. The process of claim 1, wherein at least one of the first portion and second portion contain a carbonate and wherein the subjecting step comprises contacting the at least one of the first portion and second portion with an acid to neutralize the carbonate.

11. The process of claim 1, wherein the oxidized material is contained in a slurry and the subjecting step comprises:
contacting the slurry with a diluent to decrease the temperature of the slurry.

12. The process of claim 11, wherein the volumetric ratio of the slurry to the diluent ranges from about 1:3 to about 1:15.

13. The process of claim 11, wherein the diluent is an aqueous solution.

14. The process of claim 1, wherein the second portion of the feed material has a higher precious metal content than the first portion of the feed material.

15. A process for recovering a precious metal from a refractory and/or carbonaceous feed material comprising a precious metal sulfide, comprising:
(a) floating a first portion of the feed material to form a concentrate fraction having a first sulfide sulfur content and a tails fraction;
(b) combining at least a portion of the concentrate fraction with a second portion of the feed material that is not floated and having a second sulfide sulfur content to form a combined feed material wherein the second sulfide sulfur content is less than the first sulfide sulfur content;
(c) pressure oxidizing the combined feed material to form a slurried oxidized feed material containing the precious metal;
(d) diluting the slurried oxidized feed material with an aqueous solution in a volumetric ratio of aqueous solution to slurried oxidized feed material of at least about 3:1;
(e) leaching the diluted, slurried oxidized feed material in the presence of a thiosulfate lixiviant to form a pregnant leach solution comprising dissolved precious metal;
(f) absorbing the precious metal in the pregnant leach solution onto a resin to form a pregnant resin containing the precious metal and a stripped leach solution; and
(g) desorbing the precious metal from the pregnant resin to form a precious metal product and a stripped resin, wherein the concentrate fraction has a sulfide sulfur content ranging from about 5 to about 30 percent sulfur by weight and the second portion has a sulfide sulfur content ranging from about 1 to about 3 percent sulfur by weight, and wherein the sulfide sulfur content of the combined feed material ranges from about 6 to about 20% by weight, and wherein the weight ratio of the concentrate fraction to the second portion of the feed material in the combining step (b) ranges from about 1:20 to about 1:1.

16. The process of claim 15, further comprising
recovering a precious metal contained in the tails fraction.

17. The process of claim 1, wherein in the diluting step, the aqueous solution is contacted with a base material to neutralize acid transferred to the aqueous sotution by the slurried oxidized feed material and thereafter again contacted with the slurried oxidized feed materal.

18. A process for recovering a precious metal from a refractory and/or carbonaceous feed material comprising a precious metal sulfide, comprising:
(a) floating a first portion of the feed material to form a concentrate fraction and a tails fraction;
(b) combining at least a portion of the concentrate fraction with a second portion of the feed material that is not floated to form a combined feed material;
(c) subjecting the combined feed material to pressure oxidation in an autoclave to produce a slurried oxidized feed material comprising the precious metal;
(d) diluting the slurried oxidized feed material to form a diluted, slurried oxidized feed material;
(e) leaching the precious metal from the diluted, slurried oxidized feed material in the presence of a thiosulfate lixiviant and a dissolved base metal to produce a pregnant leach solution containing dissolved precious metal and a waste material;
(f) absorbing the precious metal in the pregnant leach solution onto a resin to form a pregnant resin containing the precious metal and a stripped leach solution; and
(g) desorbing the precious metal from the pregnant resin to form a precious metal product and a stripped resin, wherein the concentrate fraction has a sulfide sulfur content ranging from about 5 to about 30 percent sulfur by weight, the combined feed material has a sulfide suflur content ranging from about 6 to about 20% by weight and the second portion has a sulfide sulfur content ranging from about 1 to about 3 percent sulfur by weight and wherein the weight ratio of the concentrate fraction to the second portion of the feed material in the combining step (b) ranges from about 1:20 to about 1:1.

* * * * *

UNITED STATES PATENT AND TRADEMARK OFFICE
CERTIFICATE OF CORRECTION

PATENT NO. : 6,251,163 B1
APPLICATION NO. : 09/034846
DATED : June 26, 2001
INVENTOR(S) : King It is certified that error appears in the above-identified patent and that said Letters Patent is hereby corrected as shown below:

Column 3, line 16 and column 3, line 18, each occurrence of reference numeral "47" should read --45--;

Column 3, line 23, reference numeral "14" should read --18--.

Column 5, line 49, insert --104-- between the words "thickened" and "with".

Claim 4, cancel the word "or" in the preamble and insert --of-- in its place.

Claim 17, cancel the word "materal" and insert --material-- in its place.

Signed and Sealed this

First Day of May, 2007

JON W. DUDAS
*Director of the United States Patent and Trademark Office*